United States Patent [19]

McCollum

[11] 3,970,861

[45] July 20, 1976

[54] DEMAND CONTROLLER

[75] Inventor: Samuel C. McCollum, Springfield, Ill.

[73] Assignee: Sangamo Electric Company, Springfield, Ill.

[22] Filed: Oct. 18, 1974

[21] Appl. No.: 515,836

[52] U.S. Cl. .............................. 307/35; 200/38 B; 318/472
[51] Int. Cl.² ........................................... H02J 3/00
[58] Field of Search ........................... 307/31–41, 307/62, 141, 141.4, 141.8; 200/38 B; 219/485, 486, 488, 483, 490; 318/471, 472, 473

[56] References Cited
UNITED STATES PATENTS

| | | | |
|---|---|---|---|
| 2,878,436 | 3/1959 | Mundt | 318/472 X |
| 3,291,998 | 12/1966 | Wildi | 307/35 |
| 3,578,950 | 5/1971 | Moratz | 219/486 |

Primary Examiner—Robert K. Schaefer
Assistant Examiner—M. Ginsburg
Attorney, Agent, or Firm—Johnson, Dienner, Emrich & Wagner

[57] ABSTRACT

A peak load control and power-distributing system for residential or small commercial/industrial use in which some loads are uncontrolled and others are controlled. Current transformers in the main feeder for all loads supply current to a thermal switch to detect when the power demand exceeds a predetermined value. The thermal switch starts a small synchronous motor having gears driving a shaft with cams operating microswitches for the controlled loads. One cam switch enables the motor to operate through a preprogrammed cycle, and to turn off at the end of a cycle whenever the thermal switch indicates the power demand has dropped below the predetermined value.

11 Claims, 1 Drawing Figure

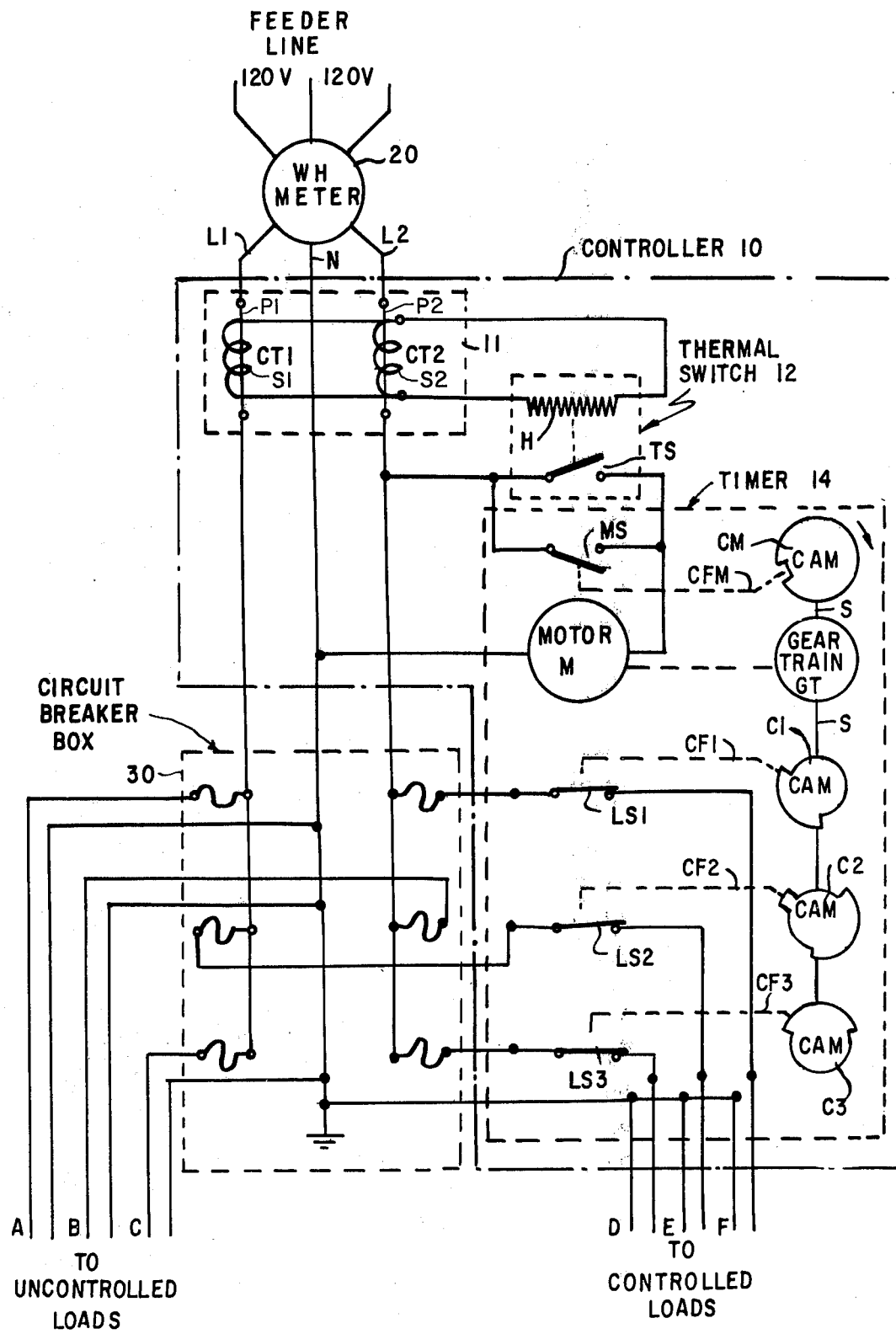

DEMAND CONTROLLER

BACKGROUND OF THE INVENTION

This invention relates to a load-control and power-distributing system with a cycler for controlled loads which is operated whenever the demand exceeds a predetermined amount.

Electrical loads in factories, institutions and private homes are subject to appreciable daily fluctuations and seasonal variations. Power consumption charges for industrial consumers are usually computed on the basic maximum demand established by the consumer's basic requirements during the period under consideration. To lessen the effect of instantaneous loads of excessive magnitude, it is customary to use a maximum demand figure that has been averaged over periods varying from fifteen minutes to perhaps thirty minutes by means of suitable demand meters. More often than not, the financial charges to the power consumer are combined functions of both the averaged maximum demand and the total energy consumption during the period for which these charges are computed.

Although off-peak water heating with a separate meter is well known, the use of demand meters has not in the past been common in private homes. However, the use of large loads, such as electric space heating, in homes may eventually make the use of a demand type rate structure desirable. Because of a thermal time constant in buildings, it is possible to enable the heaters at controlled time intervals and, as is known in the field, thereby effect a significant lowering of the electrical demand. It is further known that essential service loads, such as lighting, stoves, and most electromechanical machines all give off heat in amounts equal to the electric power which they consume. These types of loads contribute to the total building heat much in the manner of standard space heaters. Consequently, when these essential loads are on, the space heating load can be reduced by an equal amount (so as to maintain a constant demand) without affecting the comfort of the occupants.

The description of a load-stabilizer having a sequential order of priority is described in T. Wildi U.S. Pat. Nos. 3,133,202 issued May 12, 1964, 3,291,998 issued Dec. 13, 1966 and 3,489,913 issued Jan. 13, 1970. The last of these patents also described a cycler as used in combination with a load-stabilizer to give equal priority to space heating loads.

While the load-stabilizer has been successfully applied in a number of different basic applications for commercial and industrial power consumers, as well as in apartment buildings, the known types of stabilizers would be unduly expensive if used for private homes or small commercial applications.

SUMMARY OF THE INVENTION

The object of this invention is to provide an inexpensive demand control arrangement for use in power distribution systems for smaller buildings, such as small businesses, private homes and the like.

According to the invention, a multiple load control and power-distribution system has uncontrolled loads connected directly via the usual fuses or circuit breakers to the feeder line, and controlled loads (such as space heaters) connected via individual load switches and fuses or circuit breakers to the feeder line. A simple demand detector is connected to monitor the total current used by all the loads, which upon detecting a preset value starts a cycler unit, to sequentially open the load switches for the controlled loads according to a preset pattern. An off-normal switch is operative to ensure that the cycler unit operates for one complete cycle, and returns to a starting point or home position.

In a preferred embodiment, the demand detector includes current transformers connected in the feeder line to sense the line current, and a thermal switch heater connected to the current transformers for operating a switch set whenever a predetermined value of current flows in the feeder line.

One significant advantage in the use of a thermal switch as a detector is that no isolation transformers, rectifiers, or direct-current control circuits are required.

Further, in the preferred embodiment, the cycler comprises a small synchronous motor with a self-contained gear train and an output drive shaft on which are mounted multiple cams for operating micro switches and associated cam followers in a cyclic pattern. One of these cam switch units is used to interlock the motor power supply circuit so that once the sequencing operation has been started by the thermal switch, it will be continued for one complete revolution even if the thermal sensing switch should open before the end of the cycle as a result of the current flow in the feeder line dropping below the selected demand value.

DESCRIPTION OF THE DRAWING

The single FIGURE is a schematic diagram of a load control and power distributing system according to the invention.

DESCRIPTION OF THE PREFERRED EMBODIMENT

With reference to the single Figure, the residential demand controller 10 is shown thereat as connected for use in a power distribution system which includes a watthour meter 20, and a circuit breaker box 30. The meter 20 would be one incorporating a demand meter which registers information for use by the utility company in determining the average demand load for a given period. The circuit breaker box 30 provides power to branch circuits A–F via over-load devices, which may be either circuit breakers or fuses, shown in the drawing by conventional fuse symbols. There is also normally a main disconnect switch with fuses, not shown in the drawing.

In the drawing, three (A–C) of the six branch circuits A–F are connected directly to uncontrolled loads, and three (D–F) are connected via the controller 10 to controlled loads. Each of the lines L1 and L2 may have both controlled and uncontrolled loads connected thereto so as to obtain some degree of balance for the two lines.

The function of controller 10 is to sense when a preselected value of current has been reached, and to then set into operation a switching sequence which causes selected deferrable loads (such as water heaters and zones of electric space heating) connected to the three branch circuits (D–F) in the house to be energized in sequence or in various patterns but not all simultaneously. The controller 10 basically comprises three functional units, namely a current transformer assembly 11, a thermal switch 12, and a timer 14.

The function of the combination of the current transformer assembly 11 and thermal switch 12 is to sense power consumption. In the interest of economy, it is made sensitive to the feeder currents only, and this is a satisfactory measure of power when the feeder voltage is reasonably constant.

The current transformer assembly comprises two current transformers CT1 and CT2 having primary windings P1, P2 connected respectively to the two wires, L1, L2 of the feeder line, and secondary windings S1, S2 connected respectively in parallel to the heater element of a thermal switch 12. The current transformer in one embodiment comprised units normally used in thermal combination meters which are mounted on meter socket connectors capable of handling the large conductors L1, L2, LN of an electrical entrance cable. The units were selected to provide a current transformation ratio in the order of 40 amperes/1 ampere.

The heater H of the thermal switch 12 is energized by the current flow in the secondary of the current transformers CT1, CT2 and with the flow of a predetermined value of current for a predetermined thermal time delay, is operative to complete a start circuit for timer 14. In one embodiment the switch was of the same type as is commercially used on a thermal ground relay, available from Sangamo Electric Company as Model 9060280-100.

In such unit the thermal time delay was in the order of two minutes, and the preselected current value at which action occurs is adjustable over a limited range of input currents, such as 1 to 2 amps.

The cycler or sequencing timer 14 in the disclosed embodiment comprises a small 120-volt synchronous motor M, which may be of the type available as Zenith Controls, Inc. Model WM-6, which has a self-contained gear train GT and an output drive shaft S having a speed of one revolution each fifteen minutes. The gear train GT drives a shaft S on which are mounted multiple cams CM, C1–C3. Microswitches LS1–LS3 which may be of the type commercially available as Unimax which is of the type which includes a biassed member internally for effecting fast switchover from break to make condition, have associated cam followers CFM, CF1–CF3 located for operation by the cams C1–C3 and CM. One of these cams CM and its switch MS is used to interlock the energizing circuit for the motor M so that once the first energizing circuit is enabled by the thermal switch TS, the motor M and gear train GT will be held operated by the second energizer circuit over switch MS for one complete revolution even if the thermal sensing switch TS should be open before the end of such revolution or cycle. The other cams C1, C2 and C3 operate microswitches LS1, LS2 and LS3 respectively to selectively connect the controlled loads via the branch circuits D, E, F to the feeder line L1, L2, N.

In the normal or home position of the timer 14, cam CM must be arranged to open switch MS and cams C1–C3 must be arranged to close the load switches LS1, LS2 and LS3. The cams such as C1–C3 are shown as to permit flexibility in providing different timing periods for the different loads. The cam surfaces in the preferred embodiment have a sharp trailing edge whereby the associated cam followers operate the microswitch from the on to the off condition in a rapid manner. It will be seen therefore that a quick make is achieved internally of the microswitch and a quick break is achieved by the camming surface on cams C1–C3. Any reasonable number of such cams and switches may be provided in the unit. With the cam arrangement shown in the drawing, during approximately one third of each cycle, one of the three controlled loads is connected, and the other two are disconnected, the cam surfaces being fashioned to provide a brief period of overlap at the time of changeover whereby two output circuits may be simultaneously connected to the feeder line for such brief period. In a typical residential installation, the load switches, such as LS1–LS3 and the associated terminal board preferably would be selected to handle 20 ampere circuits.

OPERATION

In operation, when there is a low or moderate consumption of power being drawn by the combination of the controlled loads D, E, F and the uncontrolled loads A, B, C, switch TS is open and the timer 14 is stopped with switch MS open and switches LS1–LS3 all closed by reason of the timer 14 being in the home position.

Assume now there is an increase of power consumption by one or more of the loads, either uncontrolled or controlled, which results in a current output by current transformers CT1, CT2 of a value and for a period sufficient to operate the thermal switch 12. In the present embodiment, current flow through heater H of 2 amps for two minutes is required to cause thermal switch 12 to close switch TS.

As switch TS closes, motor M is now energized from line L2 via switch TS, and line N. Motor M responsively rotates and via gear train GT turns shaft S. The cam CM via cam follower CFM closes switch MS to complete a locking path in parallel with the start path for motor M, so that the motor M continues to run even though the power consumption from the feeder line may drop to a value during the cycle which permits switch TS to open.

As motor M operates, shaft S rotates cams C1–C3 in a clockwise direction, and in such rotation the camming surface on cams C2, C3 move out of engagement with the cam follower CF2, CF3 to cause switches LS2, LS3 to quickly open (i.e., by reason of the sharp edge of the cam surface). Cam follower CF1 remains in engagement with the camming surface C1 for a period of approximately five minutes and accordingly switch LS1 will remain closed to provide power from the feeder line to output circuit F.

After a period of approximately five minutes (cycle shaft S having a fifteen minute cycle in the disclosed embodiment), the camming surface on cam C2 moves into engagement with cam follower CF2 and switch LS2 is closed, and a brief period thereafter the camming surface on cam C1 moves out of engagement with its associated cam follower CF1, and switch LS1 is opened, whereby for a brief overlap period both switches LS1 and LS2 are closed to connect the feeder line to both circuits E and F.

After a further five minute period, the camming surface of cam C3 moves into engagement with cam follower CF3 and switch LS3 is closed, and shortly thereafter the camming surface of cam C2 moves out of engagement with cam follower CF2 which opens switch LS2. The camming surface of cam C1 is out of engagement with cam follower CF1, and switch LS1 is also open at this time.

Camming surface on cam C3 maintains switch LS3 closed for a further period of five minutes at the end of which period camming surface of cams C1, C2, C3 operate cam followers CF1, CF2, CF3 to close switches LS1, LS2, LS3 and the homing notch on cam CM is brought into engagement with the cam follower CFM which operates to open switch MS. The cycler is now in its home position.

Switch TS may be either open or closed when the timer reaches its home position. If it is open, the motor M is deenergized and stops, so that all loads remain connected. On the other hand, if switch TS is closed, the motor M continues to run for another complete cycle.

ALTERNATIVE EMBODIMENTS

The cams C1–C3 may be either fixed or adjustable and may be set for any desired pattern of operation during the 15-minute cycle. With the pattern shown in the drawing, each load is energized for five minutes of the cycle. This may be varied for any total time for each load from 0–15 minutes.

If it is desired to control more loads, additional cams may be provided on shaft S. Also, while current sensing is disclosed, other forms of sensing, such as voltage sensors, could be employed.

It is known that a number of utilities have summer or winter demand peaks which are directly related to the outside temperature. The extensive use of air conditioning units in summer whenever outdoor temperatures exceed a certain value will frequently result in abnormal peaks. In such instances, by using a temperature sensor in lieu of thermal switch 12 to effect operation of the load controller of the present invention, the air conditioning units in a building can be alternately energized during peak periods. Ostensibly, the use of large numbers of such controllers would result in the corresponding easing of the distribution problems of the utility.

Other applications in which the switching of a plurality of deferrable loads in existing systems is to be provided without the need for a major rewiring project will be readily apparent to those skilled in the art.

Other modifications which are considered to be within the scope of the invention will be apparent to parties skilled in the art.

I claim:

1. In a multiple load control for use with a feeder line which supplies power to controlled and uncontrolled multiple loads:
  a thermal switch, first means connecting said thermal switch to said feeder line to monitor the total power being used from said feeder line at any time by said uncontrolled and controlled loads, said thermal switch being operative only whenever the total power supplied by the feeder line to said multiple loads exceeds a predetermined value for a predetermined period of time,
  a plurality of load switches for selectably connecting said controlled loads to said feeder line,
  cycling means for operating each of said load switches in a present pattern to effect connection of each controlled load to the feeder line at least once in each cycle, and
  hold means operative to effect completion of each cycle of said cycling means responsive to initiation of a cycle by said thermal switch.

2. A multiple load control, as set forth in claim 1, wherein said thermal switch comprises a heater and thermally actuated contacts operated by said heater, and said first means comprises first and second current transformer means having primary winding means connected to a first and second conductor in said feeder line, and secondary winding means connected to said heater so that current flows through the heater as a function of the total power which flows over said first and second conductor of the feeder line.

3. A multiple load control, as set forth in claim 2, wherein said heater actuates said contacts in response to a preset value of current flow over said heater and only after a predetermined thermal delay and said thermal switch includes means for adjusting said present value of current.

4. In a multiple load control for use with a feeder line which energizes controlled and uncontrolled power loads:
  a plurality of load control switching devices, each of which is selectively operative to connect a different one of said controlled power loads to said feeder line,
  detection means connected to monitor the total power being used from said feeder line at any time by said uncontrolled and controlled power loads and to produce an output signal only when the total power on said feeder line exceeds a predetermined value, and
  cycling means having first means responsive to said output signal to operate each of said load control switching devices to connect each of said controlled loads to the feeder line at least once in each cycle of the cycling means according to a present pattern, said cycling means being operative to connect a number of loads less than the entire plurality of controlled loads to the feeder line for substantially the entire cycle, and hold means for effecting uninterrupted completion of each cycle by said cycling means independently of said output signal from said detection means.

5. In a multiple load control, as set forth in claim 4, wherein said detection means includes sensing means and a first two-state device coupled so that the sensing means responds to the total power exceeding said predetermined value for a predetermined period of time to set the firt two-state device to one state, and responds to total power below said predetermined value to set the first two-state device to its other state; and
  wherein said first means includes timing means started responsive to said first two-state device being in said one state, and said hold means comprises a second two-state device which is set to one state upon starting of the timing means to advance the timing means through its cycle to completion thereof, the second two-state device being set to its other state in response to the completion of said cycle, and the timing means being operative to continue into another cycle only if the first two-state device is in said one state following the completion of the cycle.

6. In a multiple load control, the combination according to claim 5, wherein said sensing means comprises a thermal switch including a heater, and means connecting said heater to said feeder line, and in which said first two-state device comprises thermally actuated contacts operated by said heater.

7. In a multiple load control for use with a feeder line which energizes controlled and uncontrolled loads:
  a plurality of load switches, each of which is operative to connect at least one of said controlled loads to said feeder line, a timer comprising an electrically operated drive means mechanically coupled to drive a shaft having a first plurality of attached cams and cam followers to operate each of said load switches according to a pattern in each cycle of the timer to connect each controlled load to the feeder line for a preset period in each cycle, the number of controlled loads connected to the feeder line during the cycle for substantially the entire cycle being less than the total number of controlled loads, said drive means having a normal position in which said first plurality of cams and cam followers close all of said load switches, detection means for completing a first circuit for energizing said drive means in said normal position in response to detection of a predetermined condition, an off-normal switch operated by a further cam follower and a further cam on said shaft to complete a hold circuit for said drive means whenever said drive means is operated from said normal position to thereby insure completion of each cycle as initiated by said first circuit, and to open said hold circuit whenever the preset cycle of said drive means is completed and returns to said normal position.

8. In a multiple load control, the combination according to claim 7, including means for adjusting at least one of said cams to change the portion of said cycle during which its cam follower opens and closes one of said load switches.

9. In a multiple load control, the combination according to claim 7, wherein said detection means comprises a thermal switch having a heater, means coupling said heater to said feeder line, and thermal contacts which are operated responsive to heating by the heater when the total power on said feeder line exceeds a predetermined value for a predetermined period of time, said contacts being connected in said first circuit.

10. In a multiple load control, the combination according to claim 9, wherein said thermal switch actuates its contacts in response to a present value of current with a predetermined thermal delay, and means for adjusting said thermal switch to operate in response to different preset values of current.

11. In a multiple load control the combination according to claim 10, wherein said detection means includes current transformer means having primary winding means connected to the feeder line and secondary winding means connected to said heater so that current flows through the heater as a function of the total power being used from the feeder line.

* * * * *

UNITED STATES PATENT OFFICE
CERTIFICATE OF CORRECTION

PATENT NO. : 3,970,861
DATED : July 20, 1976
INVENTOR(S) : Samuel C. McCollum

It is certified that error appears in the above—identified patent and that said Letters Patent are hereby corrected as shown below:

Column 5, line 58, "present" should be -- preset --;

Column 6, line 29, "present" should be -- preset --;

Column 8, line 16, "present" should be -- preset --.

Signed and Sealed this

Sixteenth Day of November 1976

[SEAL]

Attest:

RUTH C. MASON
Attesting Officer

C. MARSHALL DANN
Commissioner of Patents and Trademarks